United States Patent Office 3,172,887
Patented Mar. 9, 1965

3,172,887
PURIFICATION OF MELAMINE
Enrico Bondi, Legnano, Italy, assignor to Montecatini Società Generale per l'Industria Mineraria e Chimica, Milan, Italy
No Drawing. Filed June 10, 1963, Ser. No. 289,769
Claims priority, application Italy, June 14, 1962, 12,057/62
7 Claims. (Cl. 260—249.7)

My invention relates to the purification of melamine and more particularly to a process for the continuous purification of melamine.

Raw melamine contains, in addition to water insoluble impurities, quantities of soluble impurities sufficient to interfere with the end uses for melamine. The soluble impurities consist of oxyaminotriazines and isotriazinic products. These impurities amount to from 3 to 5% by weight of the raw melamine.

It is an object of my invention to provide a process for a more thorough purification of melamine. It is a further object of this invention to provide a process for reducing the concentration of impurities, such as oxyaminotriazines and products with isotriazinic rings present in raw melamine, to less than 1%.

It is also an object of the invention to provide a process that performs the above objects on a continuous basis.

The above and ancillary objects of my invention will become apparent from the following detailed description of the invention.

The invention is base on the discovery that oxyaminotriazines and isotriazinic products are fixed on strongly basic anionic exchange resins. While oxyaminotriazines are fixed on these resins at temperatures from ambient to the boiling point of aqueous solutions of melamine, I have found that the isotriazines are not appreciably fixed on such resins at temperatures below 70° C.

Anionic ion exchange resins generally suitable for carrying out the purification of melamine according to the invention are of the general class known to the industry as strongly basic anionic resins. Such resins generally are copolymers of styrene and divinylbenzene and are chloromethylated and aminated. Commercial resins of this description are available as "Montecatini A 300" resin produced by Montecatini of Milan, Italy; "Amberlite IRA 410" manufactured by Rohm and Haas, of Philadelphia, Pa., U.S.A., and "Dowex 2" manufactured by the Dow Chemical Corporation of Michigan, U.S.A.

The impurities or by-products fixed on the resin may be easily eluted with alkaline solutions such as aqueous solutions of sodium hydroxide, and are recovered by neutralization of the eluates to the pH range 6–8.

The invention is carried out in apparatus comprising a vessel equipped with an agitator and a heating coil for dissolving the raw melamine fed thereto by a pipe. The melamine is dissolved in mother liquors fed to the vessel by another pipe. The dissolved raw melamine in the mother liquors is led from vessel to an ion exchanger column equipped with a heating jacket traversed by thermostatic fluids. The effluents from the column are led through a pipe to a jacketed crystallizer provided with an agitator and a cooling-water supply. The slurry from the crystallizer passes into a centrifuge. The melamine crystals are fed from the centrifuge through a duct, and the mother liquor is pumped back to the dissolving vessel for recycling.

In operation, the raw melamine is dissolved in the mother liquor saturated with respect to melamine at 25° C. The additional melamine is dissolved by heating the mother liquor solution contained in the dissolving vessel to about 95° C. Steam or another heat source is used to produce this temperature increase. The saturated solution of raw melamine is percolated through the exchanger column packed with the strongly basic anionic exchange resins. The percolating liquid is maintained at saturation by keeping the temperature in the exchanger column at approximately 95° C. by means of a heated circulating fluid medium fed through the jacket from a heat source. The effluent from the column is run into the crystallizer where the liquid is cooled to approximately 25° C. to initiate and induce crystallization. The slurry of melamine crystals in mother liquid passes into the centrifuge where the melamine crystals are separated from the mother liquor. The melamine crystals are conveyed to dryers and storage bins while the mother liquors are returned by the pump to the vessel for recycling.

It will be noted that it is generally preferred to operate the exchange absorption at 90 to 95° C. in order to afford removing the impurities from the melamine by means of a single passage through the resin column.

The exchange reaction may to conducted at temperatures lower than 90° C., but this requires a larger volume of mother liquor for transporting a given amount of melamine, since the solubility of melamine decreases as the temperature decreases.

While there has been no specific description of regenerating the ion exchange resin by elution of the absorbed impurities with the aid of sodium hydroxide solutions, such procedures are well known in the ion-exchanger art and are applicable for the purposes of the invention as is the recovery of the particular impurities, either generally from the single-stage column or specifically from the two-stage procedure.

The invention will now be further described with reference to examples of the process.

Example 1

A raw melamine with the following characteristics:

|   | Percent by weight |
|---|---|
| Titre | 97.0 |
| Water insoluble substances | 0.3 |
| Oxyaminotriazines | 2.0 |
| Isotriazines | 0.7 | is dissolved at 95° C. to obtain a solution containing 4.5 grams of melamine per 100 grams of water. This solution is allowed to percolate through a column filled with ion exchange resins of a strongly basic type such as "Montecatini A 300" resin. The exchanger column is kept at a temperature in the range 92.01 to 95° C., and the percolation rate is 5 volumes of the solution per volume of resin per hour. The effluent solution from the column is cooled and allowed to crystallize. From the effluent solution cooled to 25° C. a crystalline product showing the following characteristics is obtained:

|   | Percent by weight |
|---|---|
| Titre | 99.6 |
| Water insoluble substances | <0.1 |
| Oxyaminotriazines | 0.1 |
| Isotriazines | 0.4 |

Example 2

A solution of raw melamine similar to the one of Example 1 is treated under the same conditions as in the preceding Example, except that the percolation rate is reduced to 2.5 volumes of solution per resin volume per hour. This is one-half of the rate of the previous example. A crystalline product is obtained showing the following characteristics:

| | Percent by weight |
|---|---|
| Titre | 99.75 |
| Combined water-insoluble substances and oxytriazines | <0.1 |
| Isotriazines | 0.2 |

Example 3

Raw melamine as in Example 1 is dissolved in water by heating at 60° C. The saturated melamine solution contains 1.4 parts of melamine per 100 parts of solvent. The solution is allowed to percolate at a rate of 5 volumes of solution per resin volume per hour through an exchanger resin column, as in Examples 1 and 2, except that the column is maintained at 60° C. An aliquot portion of the effluent from the column is cooled and allowed to crystallize. The melamine crystals have the following characteristics:

| | Percent by weight |
|---|---|
| Titre | 99.2 |
| Oxyaminotriazines and water-insoluble substances | <0.1 |
| Isotriazines | 0.7 |

I claim:

1. A process of purifying raw melamine which comprises preparing saturated aqueous solutions of melamine at temperaures in the range between 50° and 95° C., percolating said solutions through an ion exchange column filled with a strongly basic anionic exchange resin kept at the temperature range at which the melamine solution was prepared, and recovering the effluent solution of purified melamine.

2. The process of purifying raw melamine according to claim 1, wherein the solution temperature is 95° C. and the column temperature is 95° C.

3. The process of purifying raw melamine according to claim 1, wherein the solution is precolated through the ion exchange column at rates of between 0.5 and 10 volumes of solution per volume of resin per hour.

4. The process of purifying melamine according to claim 3, wherein the percolation range is between 2 and 6 volumes of solution per volume of resin per hour.

5. The process of purifying melamine which comprises preparing a saturated aqueous solution of raw melamine at temperatures in the range between 50 and 90° C., percolating said solution through an ion exchanger column filled with strongly basic anionic exchange resins, said column and contained resin being maintained at the temperature of the melamine solution, at a percolation rate of less than 10 volumes of solution per volume of resin in the column per hour, cooling the effluent solution from the column to temperatures below the crsytallization temperature of the purified melamine, and separating the crystals of the purified melamine from the remaining mother liquor.

6. The process according to claim 5, wherein the aqueous solution from which the saturated solution of raw melamine is prepared is the mother liquor.

7. A process for purification of melamine and recovery of the by-product impurities, containing oxyaminotriazines and isotriazines, which comprises the steps of preparing a saturated solution of raw melamine at a temperature in the range between 80° and 95°, percolating said saturated solution through a column of strongly basic anion exchange resin maintained at the solution temperature, recovering the effluent from said column, crystallizing the purified melamine therefrom by cooling, eluting the by-product oxyaminotriazines and isotriazines from the column with sodium hydroxide solution, and recovering the by-products from the eluate by neutralization.

No references cited.